United States Patent [19]

Junker et al.

[11] Patent Number: 4,704,577
[45] Date of Patent: Nov. 3, 1987

[54] EDDY CURRENTS PROBE FOR MEASURING A GAP BETWEEN A TUBE AND AN ANTIVIBRATION BAR

[75] Inventors: Warren R. Junker, Monroeville; Lee W. Burtner, Elizabeth Township, Allegheny County, both of Pa.

[73] Assignee: Westinghouse Electric Corp., Pittsburgh, Pa.

[21] Appl. No.: 853,592

[22] Filed: Apr. 18, 1986

[51] Int. Cl.[4] .................. G01N 27/72; G01B 7/14; G21C 17/00
[52] U.S. Cl. ................................ 324/220; 324/207; 376/258
[58] Field of Search ............... 324/207, 208, 219–221; 73/623; 376/249, 250, 251, 254, 255, 258

[56] References Cited

U.S. PATENT DOCUMENTS

| 2,650,344 | 8/1953 | Lloyd . | |
|---|---|---|---|
| 3,001,130 | 9/1961 | McClurg et al. . | |
| 3,317,824 | 5/1967 | Wood | 324/221 |
| 3,449,662 | 6/1969 | Wood | 324/220 |
| 3,906,358 | 9/1975 | Stone . | |
| 3,916,302 | 10/1975 | Madewell . | |
| 4,019,130 | 4/1977 | Sakamoto et al. . | |
| 4,303,884 | 12/1981 | Malick . | |
| 4,325,026 | 4/1982 | Cooper, Jr. et al. . | |
| 4,441,078 | 4/1984 | Lecomte . | |
| 4,480,225 | 10/1984 | Nance et al. . | |

FOREIGN PATENT DOCUMENTS

| 0110048 | 9/1981 | Japan | 324/220 |
|---|---|---|---|
| 0022951 | 2/1983 | Japan | 324/220 |
| 1197640 | 7/1970 | United Kingdom | 324/262 |

Primary Examiner—Gerard R. Strecker

[57] ABSTRACT

A gap measurement probe for measuring the gap between a tub and an antivibration bar in a steam generator includes a shaft and first and second sensors mounted on one end of the shaft. Each of the sensors includes a coil form having a first portion fastened to the shaft and having a second C-shaped portion surrounding a portion of the periphery of the shaft. A test coil is mounted on the second C-shaped portion of each of the coil forms and the test coils are arranged such that they extend about different portions of the circumference of the shaft so as to sense different portions of the circumference of the tube when the gap measurement probe is inserted in the tube. The coil forms are flexible and have a circumference which is sufficiently large to press the test coils against the inside of the tube to provide for accurate sensing. In addition, the shaft is preset with a C shape at the end on which the sensors are mounted, so that when the probe is inserted in a U-shaped tube, the probe is self-orienting in the U bend of the tube.

13 Claims, 9 Drawing Figures

EDDY CURRENTS PROBE FOR MEASURING A GAP BETWEEN A TUBE AND AN ANTIVIBRATION BAR

BACKGROUND OF THE INVENTION

This invention relates to an eddy current probe and particularly to a probe for accurately measuring a gap between a tube and an antivibration bar in a steam generator for commercial nuclear power plants.

The design and operation of nuclear power plants is well known in the art. For example, U.S. patent application No. 729,385, filed May 1, 1985, now U.S. Pat. No. 4,653,576, by H. O. Lagally, and assigned to the Westinghouse Electric Corporation, the contents of which are hereby incorporated by reference, describes the structure and operation of a nuclear steam generator. As described therein, a nuclear steam generator includes a large number of U-shaped tubes oriented along the longitudinal axis of a cylinder. A reactor coolant flows into exposed openings of the plurality of U-shaped tubes and feedwater which passes up around the outside of the tubes, absorbs heat from the reactor coolant flowing within the tubes. The heat absorbed causes the feedwater to boil and produce steam which is used to drive an electrical generator.

The U-shaped tubes are arranged in columns and supported in a bundle, and a plurality of antivibration bars are typically disposed between each column of the U-shaped tubes. The configuration of the tubes is such that there is up to 10 feet between the legs of each U-shaped tube and the U-shaped tubes have a height of up to 35 feet. In the tube bundle, the tubes are arranged with a gap of approximately $\frac{1}{2}$ inch between the tubes.

The antivibration bars each comprise a bar which is bent into a V-shaped configuration, so that two legs are formed with an angle therebetween. The V ends of the bars are inserted between the U-shaped flow tubes and the free ends of the V-shaped antivibration bars are welded to opposite sides of a corresponding retainer ring. Thus, the antivibration bars are used to provide support along the length of the curved or U-shaped portion of the flow tubes. The antivibration bars are intended to prevent vibrations of the individual tubes in the tube bundle. It is known that such vibrations are caused by the flow of water and steam past the flow tubes, and that the U-shaped portion of the tube bundle is most severely affected by the vibrations. The flow-induced vibrations can cause damage to the flow tubes because of wear.

The U-shaped tubes of the tube bundle have dimensional tolerances associated with their outer diameter. There are also variations caused by ovalization of the tubes as a result of the bending of the tube in the U-shaped portion. Furthermore, the spatial relationship between adjacent tubes varies, although it is within set design limits. Thus, there is a dimensional tolerance associated with the nominal spacing between the steam generator tubes. There is also a dimensional tolerance associated with the outer dimensions of the antivibration bars which typically comprise round tubes. The antivibration bars may also comprise a square, oval, or any other shape having a uniform or non-uniform cross-section. The combination of these tolerances and dimensional variances prevents the elimination of gaps between the antivibration bars and the tubes of the steam generator. Such gaps are undesirable because they allow vibration of the tubes and relative motion between the tubes and the antivibration bars. This relative motion can cause wear and subsequent failure of the tubes of the steam generator. If the gap between the tube and the antivibration bar is small, then any vibration of the tube as it moves to hit the bar will be limited. However, if the gap becomes larger, the tube will gain additional energy as it vibrates and contacts the antivibration bar, so that wear or fretting of the tube will result.

In order to avoid the vibration and wear problems which can be caused by a large gap between a tube and an antivibration bar, a proposed solution in newly designed steam generators is to limit the clearance between the tube and the antivibration bar. In order to verify that the antivibration bar is correctly located with respect to the adjacent tube, measurement of the spacing between the tube and the bar must be accomplished.

One apparatus which has been used to measure the spacing between a tube and an antivibration bar is a "feeler" gauge mounted on top of a rod. The feeler gauge is inserted between the bar and the tube. However, because of the relatively large size of the U-shaped tubes making up the tube bundle, and the relatively small thickness of the feeler gauge (approximately 0.005 inches), remote measurement of the gap is difficult.

Eddy current inspection is routinely performed as part of an in-service inspection of a nuclear steam generator to provide data that can be used to locate support structures of a machine. Measurements used in conventional eddy current probes have been shown to be correlated to the dimensions of the structure, so that it has been proposed that an eddy current inspection could be used to measure the gap between an antivibration bar and a tube. However, for each tube there are two adjacent antivibration bars on opposite sides of the tube. Since conventional eddy current probes sense the entire circumference of the tube, a conventional eddy current probe will measure the sum of the gaps between the tube and both of the adjacent antivibration bars. Thus, a gap for an individual antivibration bar cannot be measured, so that there is a need for a probe which inspects only a portion of the tube circumference.

While 8 coil probes are available for sensing limited portions of the tube circumference, these coils are difficult to position properly to accurately sense the position of an antivibration bar. Such probes are designed with 8 coils on the circumference, with each coil sensing only a limited portion of the tube circumference. Since an antivibration bar and the tube are directly adjacent one another at only one location on the circumference of the tube, a coil with a limited view may not be positioned properly to accurately sense the gap between the bar and the tube. Experimental measurements performed with existing multiple coil probes confirmed that there is a strong dependence of the gap measurement capability on the angular position of the antivibration bar with respect to the individual sensing coil. In view of the 35 foot length of the tube, it is also difficult to control the orientation of a probe so as to achieve an accurate measurement. Thus, there remains a need in the art for a probe which is capable of accurately measuring the gap between a tube and a single adjacent antivibration bar. There is also a need for such a probe which can be readily oriented in the U-shaped portion of a flow tube despite the relatively long length of the flow tube.

SUMMARY OF THE INVENTION

Accordingly, it is an object of the present invention to provide a probe which is capable of measuring a gap between a tube and an antivibration bar in a steam generator.

Another object of the present invention is to provide a gap measurement probe which does not depend on particular angular positioning of the probe with respect to the antivibration bar, to obtain an accurate measurement.

A further object of the present invention is to provide a probe which is self-orienting when inserted into a U-shaped tube, so that sensing coils on the probe are arranged to measure the gap between the tube and adjacent antivibration bars.

The probe of the present invention includes a shaft and first and second sensors mounted on one end of the shaft. Each of the first and second sensors includes a coil form having a first portion fastened to the shaft and having a second C-shaped portion which extends from the first portion and surrounds at least a portion of the periphery of the shaft. A test coil is mounted on the second C-shaped portion of the coil form so that the test coil extends about a portion of the periphery of the shaft. The test coils are arranged on their respective coil forms so that they are adjacent different circumferential portions of the shaft.

The C-shaped portions of the coil forms are flexible so that when the probe is inserted into a U-shaped tube, the C-shaped portions of the coil form are biased against the inner diameter of the tube to ensure the accuracy of the measurements which are made via the test coil. The end of the shaft at which the sensors are located is preset with a C shape, so that when the shaft is inserted into a tube, it is self-orienting as it is positioned in the U-shaped bend of the tube. That is, the sensors mounted on the shaft will be oriented so as to correctly sense the gaps between the tube and the adjacent antivibration bars.

The probe of the present invention has a number of advantages over the prior art in that it is a directional probe which is capable of selectively detecting gaps between a tube and antivibration bars on each side of the tube with a high accuracy which is not subject to variation with changes in the orientation of the probe in the tube. In addition, the probe of the present invention has a relatively small number of parts in that it comprises only coil forms, test coils and a shaft. Further, when the shaft is formed to be self-orienting, and the probe is positioned in a U-shaped bend in a tube, only two test coils are required to accurately sense the gaps between the tube and adjacent antivibration bars.

These together with other objects and advantages which will be subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

Figure 1:
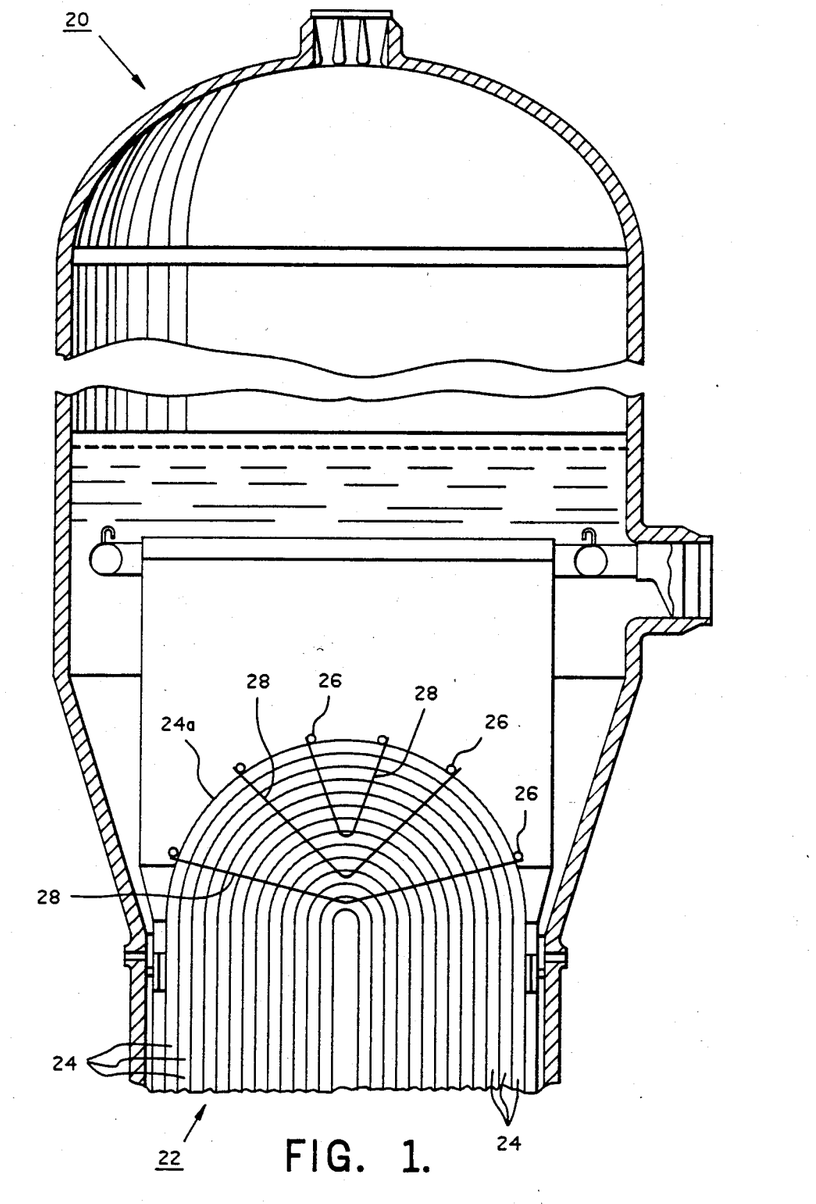
FIG. 1 is a schematic cross-sectional view of a portion of a steam generator, illustrating the arrangement of U-shaped tubes and antivibration bars.

FIG. 1 depicts a portion of a typical steam generator 20 including a bundle 22 of U-shaped tubes 24. The U-shaped portions 24a of the U-shaped tubes 24 are supported by an assembly including retainer rings 26 and antivibration bars 28. Each of the plurality of retainer rings 26 is generally of oval configuration. A plurality of sets of antivibration bars 28 are disposed between adjacent columns of the U-shaped tubes 24. One such set of antivibration bars 28 is shown in FIG. 1, and successive sets of similar antivibration bars 28 are disposed behind and in front of the illustrated set of antivibration bars 28. The antivibration bars 28 have a V-shaped configuration with varying included angles and with the ends thereof attached, for example by welding, to diametrically opposite points of the respective retainer rings 26. The number of retainer rings 26 and antivibration bars 28 depicted in FIG. 1 is for purposes of illustration, and any desired number of retainer rings 26 and antivibration bars 28 may be employed.

Figure 2:
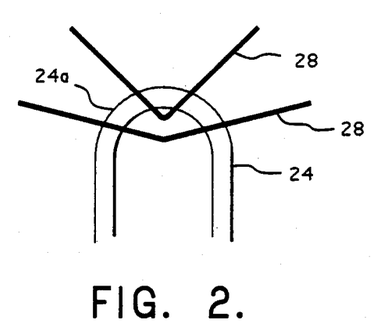
FIG. 2 is a schematic cross-sectional view of the arrangement of a single U-shaped tube and adjacent antivibration bars on one side of the U-shaped tube.
Figure 3:
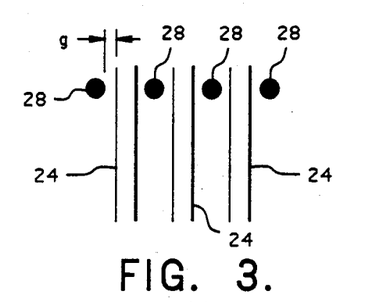
FIG. 3 is a schematic cross-sectional view of the arrangement of tubes and antivibration bars.

FIGS. 2 and 3 illustrate the relative positioning between the tubes 24 and the antivibration bars 28. In particular, FIG. 2 illustrates the relative position between a single one of the U-shaped tubes 24 and adjacent antivibration bars 28, while FIG. 3 illustrates that each U-shaped tube 24 has antivibration bars 28 positioned on opposite sides of the circumference of the tubes 24. As described above, the U-shaped tubes 24 are generally arranged so that there is approximately a one-half inch space between adjacent U-shaped tubes. One or more antivibration bars 28 are inserted between adjacent U-shaped tubes 24 so that there is a relatively small gap between a U-shaped tube 24 and an adjacent antivibration bar 28. If this gap becomes undesirably large, excessive vibration can occur and the tube 24 will contact one or both of its adjacent antivibration bars 28 with sufficient force to cause wearing of the tube 24. Thus, it is necessary to verify that the antivibration bars 28 are correctly positioned with respect to the tubes 24 (i.e., that the gap between a tube 24 and an antivibration bar 28 is within set limits).

Figure 4A:
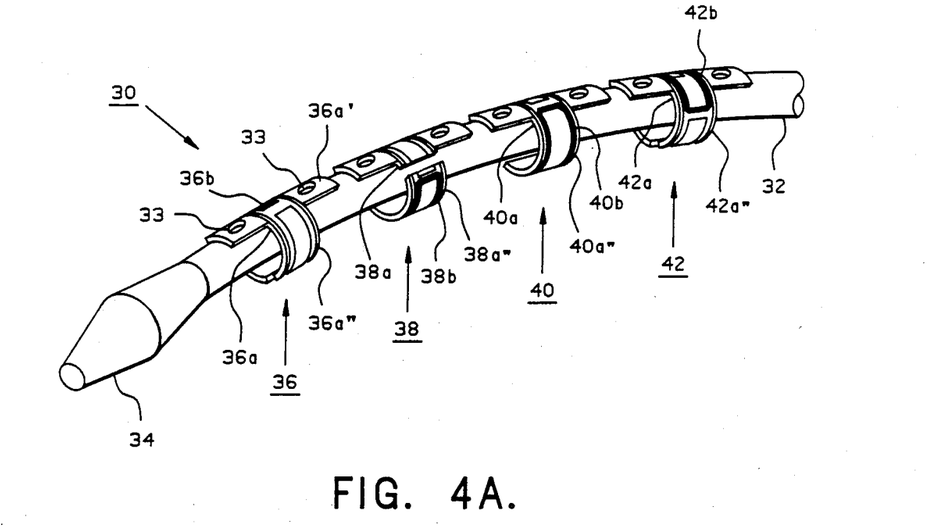
FIG. 4A is a perspective view of a probe in accordance with an embodiment of the present invention.
Figure 4B:
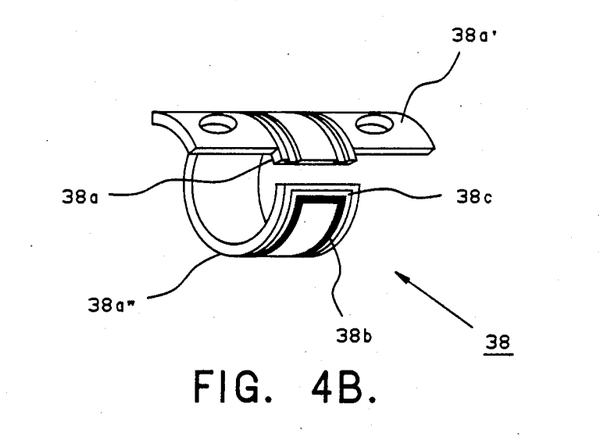
FIG. 4B is an enlarged perspective view of the sensor 38 of FIG. 4A.

FIG. 4A is a perspective view of a probe 30 in accordance with a preferred embodiment of the present invention. The probe 30 includes a spine or spring shaft 32, a tip 34 and a plurality of sensors 36, 38, 40 and 42. In the preferred embodiment, the shaft 32 is made of plastic nylon tubing preset with a C shape adjacent the tip 34. The sensors 36, 38, 40 and 42 comprise coil forms 36a, 38a, 40a and 42a, and test coils 36b, 38b, 40b and 42b, respectively. Each of the coil forms 36a, 38a, 40a and 42a includes a first portion which is fastened to the shaft 32, for example, by pop rivets. For example, coil form 36a has a first portion 36a' which is fastened to the shaft 32 by pop rivets 33 and a second C-shaped portion 36a" which extends from the first portion 36a' and surrounds at least a portion of the periphery of the shaft 32. The C-shaped portion 36a" has a groove formed therein for holding the test coil 36b, so that the test coil 36b extends about a predetermined portion of the circumference of the shaft 32. The C-shaped portions of the coil forms 38a, 40a and 42a are arranged similarly; however, each of the C-shaped portions is arranged so that the corresponding test coil is positioned adjacent a different predetermined portion of the circumference of the shaft 32 (although the different circumferential portions may overlap). Thus, the coil forms 36a, 38a, 40a and 42a have slightly different structures to accommodate the circumferential arrangement of the grooves for holding the test coils 36b, 38b, 40b and 42b, respectively, so that the test coils are arranged circumferentially about the shaft 32 as shown in FIG. 4A. FIG. 4B is an enlarged perspective view of the sensor 38 including coil form 38a and test coil 38b. The test coil 38b is mounted in a groove 38c in the coil form 38a.

In manufacturing the sensors 36, 38, 40 and 42, each test coil 36b, 38b, 40b and 42b is wound about 4 pins and while being coated with a pliable adhesive. The coated test coil is then pressed into the groove on its corresponding coil form 36a, 38a, 40a or 42a and epoxied in place. The leads from the test coil (not shown) are soldered to a pad (not shown) to which a coaxial wire (not shown) is also soldered. The coaxial wire is then inserted through the shaft 32 and extends through the shaft 32 to connect to a terminal block (not shown).

In the preferred embodiment, the coil forms 36a, 38a, 40a and 42a are formed of a plastic material such as polypropylene, so that the C-shaped curvature of the coil forms provides a spring force. The coil forms are made intentionally oversized compared to the inner diameter of the tubes 24 in which they are to be inserted, so that the curvature of the coil forms provides a spring force or bias to hold the corresponding test coils 36b, 38b, 40b and 42b against the inner surface of the tube 24. As illustrated in FIG. 4A, the test coils 36b, 38b, 40b and 42b are mounted axially along the probe and adjacent predetermined portions of the periphery of the shaft 32, so that when the probe 30 is inserted into a tube 24, each of the test coils 36b, 38b, 40b and 42b is capable of sensing a circumferential portion of the tube 24 equal to one-fourth of the circumference of the tube 24.

Figure 6:
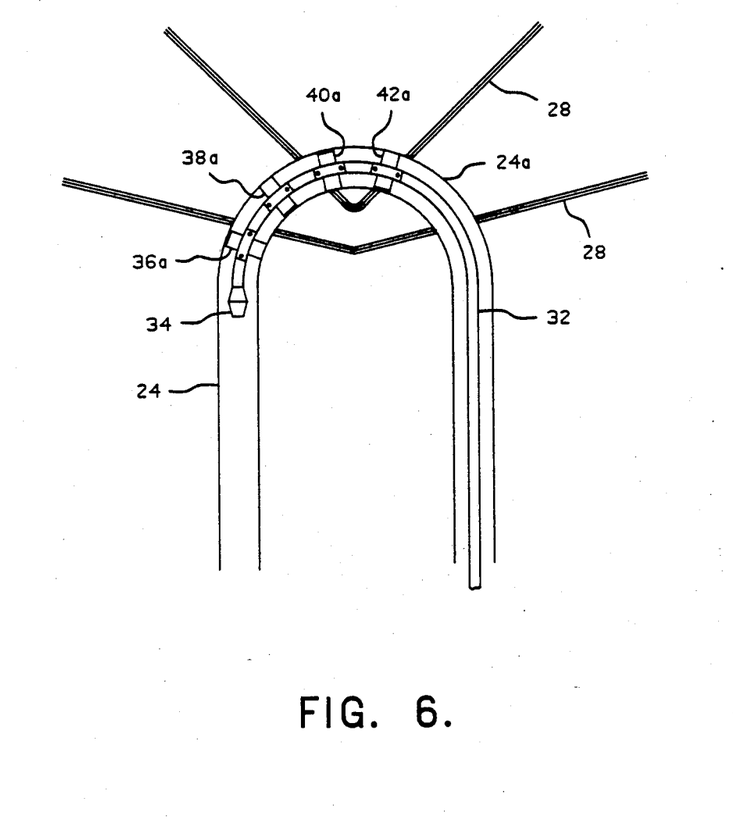
FIG. 6 is a schematic cross-sectional view of FIG. 2 for illustrating the arrangement of the probe of FIG. 4 in a tube for purposes of sensing the gap between the tube and the adjacent antivibration bars.

FIG. 6 is a schematic cross-sectional view illustrating the positioning of the probe 30 in a tube 24 for purposes of sensing the gaps between the antivibration bars 28 and the tube 24. As described above, the C-shaped portions 36a", 38a", 40a" and 42a" of the coil forms 36a, 38a, 40a and 42a, respectively, are designed so that they bias the corresponding test coils 36b, 38b, 40b and 42b against the inner surface of the tube 24. Further, as described above, the shaft 32 is preset with a C shape at the end adjacent the tip 34, so that when the probe 30 is inserted in the tube 24, the probe is self-orienting as it is pushed through the U-shaped portion 24a of the tube 24. As a result, it has been determined experimentally that only two sensors are necessary to accurately detect the gaps between the tube 24 and a pair of adjacent antivibration bars 28 which are on either side of the tube 24.

Figure 5A:
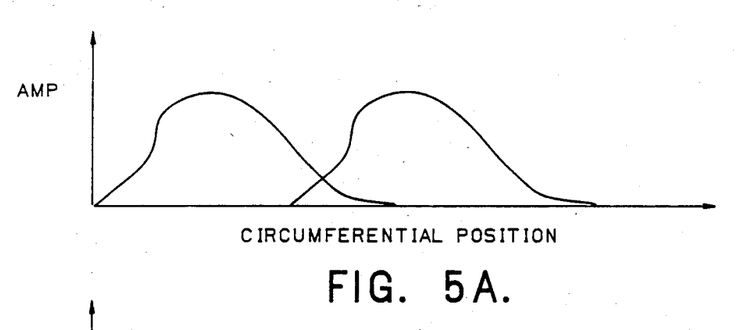
FIG. 5A is a graph illustrating the sensing characteristics of a conventional 8 coil probe.
Figure 5B:
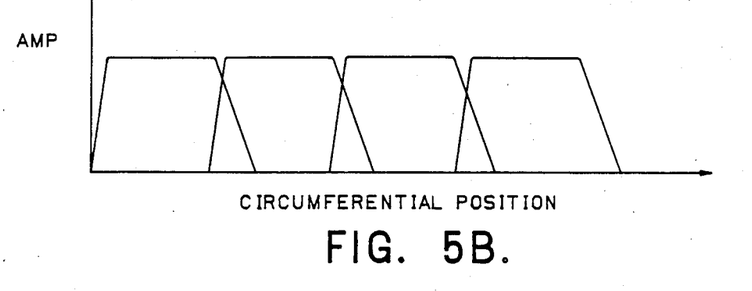
FIG. 5B is a graph of the sensing characteristics of the probe of the present invention.

FIGS. 5A and 5B are graphs of the sensing characteristics for a conventional 8 coil type probe (FIG. 5A) and the probe 30 of the subject invention (FIG. 5B), respectively. FIG. 5A illustrates the sensing characteristics for two coils of an 8 coil probe and shows that the response is not flat but falls rapidly from its peak as the position along the circumference of the tube moves away from the adjacent sensing coil. In contrast, as illustrated in FIG. 5B (which shows the sensing characteristics of a 4 coil probe in accordance with the present invention), a response characteristic having only small gaps between the response for each of the coils, is achieved. Thus, the probe 30 of the present invention is much more accurate and less sensitive to orientation of the probe then are prior art probes, such as the 8 coil type probe.

Figure 7:
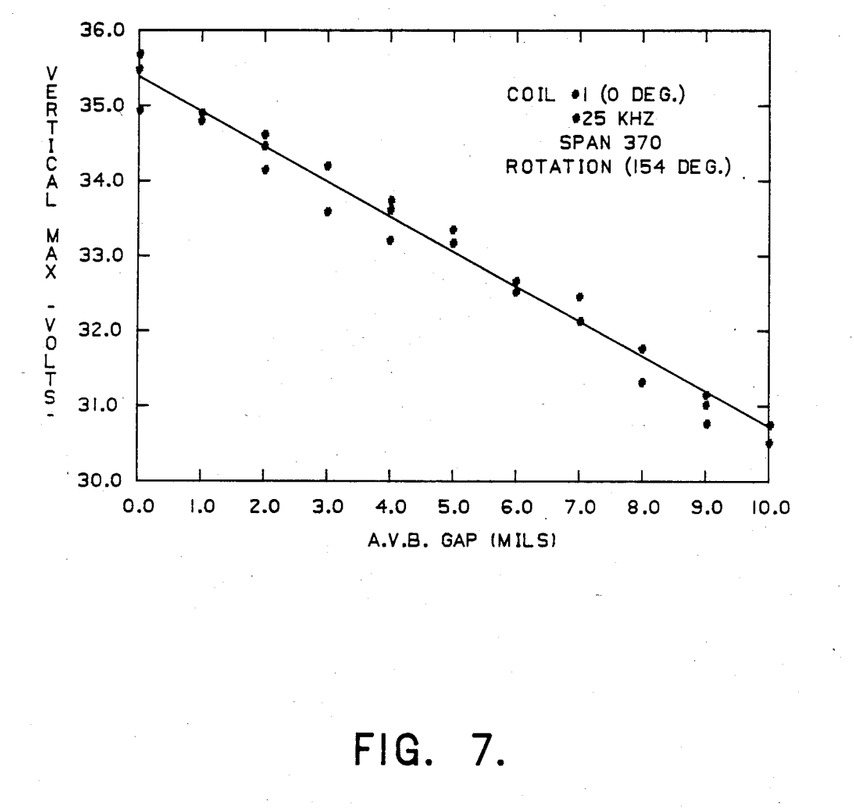
FIG. 7 is a graph of a calibration curve for calibrating the measurements of the probe of the present invention.

In order to accurately sense the gaps between a tube 24 and the adjacent antivibration bars 28, it is necessary to prepare a calibration graph for the particular type of tube 24 in which the probe is to be inserted FIG. 7 is a calibration curve which was developed using an experimental set-up for tubes 24 having a tube thickness of 43 mils., an outer diameter of 0.75 inches and an inner diameter of 0.67 inches. Once the calibration data has been developed, the calibration curve can be used to determine a gap based on the amplitude measurements which are output by the test coils 36b, 38b, 40b and 42b. Calibration is important because the wall thickness of the tube can affect the output of the sensors 36, 38, 40 and 42. In the calibration curve of FIG. 7, a frequency of 25 kHz was used; however, in the preferred embodiment, a lower frequency is used for the measurement because it has been determined that the lower the frequency, the more transparent the tube becomes to the sensors.

In order to use the probe 30 to obtain a gap measurement, the probe 30 is inserted into the tube 24 and is pulled past the antivibration bars 28 while recording the eddy current response (signal amplitude and phase). By measuring the amplitude of the eddy current response, the gap can be determined based on the calibration curve. An alternate technique for using the probe 30 of the present invention for gap measurement, is to locate an antivibration bar 28 with the probe and to position the probe at the antivibration bar 28. Then, the antivibration bar 28 is forced against the tube 24 to measure the zero point of the gap at which the antivibration bar 28 is actually contacting the tube 24. This has been found to be useful because inaccuracies in the calibration curve are a result of a shift in the zero point (due to wall ovality, wall thickness and temperature of the tubing). Since the calibration curve remains linear despite the shift in the zero point, the detection of the appropriate zero point for the measurement will provide a highly accurate measurement of the gap.

While the probe of the present invention has been described in conjunction with its use as a gap measurement probe, it may also be used for making other types of measurements. For example, the probe of the present invention may be used to sense the wear associated with existing in-service steam generator tubes. Conventionally, inspection for wear is done through the use of bobbin coils which cannot differentiate between the wear caused by antivibration bars on opposite sides of the tube. The probe of the present invention is capable of distinguishing which of the antivibration bars 28 is causing the wear, so that appropriate repairs can be made. Thus, the probe of the present invention is directional in that it can selectively detect a gap or wear on each side of the tube.

The probe 30 of the present invention may be implemented in numerous ways. For example, although the sensors 36, 38, 40 and 42 have been described as being riveted to the shaft 32, they may be fastened to any suitable type of support. Further, although the coil forms 36a, 38a, 40a and 42a have been described as being made of a plastic material, they may be made of any suitable material which allows the test coils 36b, 38b, 40b and 42b to be pressed against the inner surface of a tube 24.

The many features and advantages of the invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A probe comprising:
   a shaft having a first end;
   a first sensor mounted on the first end of said shaft, said first sensor including:
      a first coil form having a first portion fastened to said shaft and having a second portion which is a C-shaped portion extending from said first portion and surrounding at least a portion of the periphery of said shaft; and
      a first test coil mounted on the second C-shaped portion of said first coil form and extending about a first portion of the circumference of said shaft; and
   a second sensor mounted on the first end of said shaft adjacent said first sensor, said second sensor including:
      a second coil form having a first portion fastened to said shaft and having a second portion which is a C-shaped portion extending from said first portion and surrounding at least a portion of the periphery of said shaft;
      a second test coil mounted on the second C-shaped portion of said second coil form and extending about a second portion of the circumference of said shaft which is different from the first portion of the circumference of said shaft, at least part of said second C-shaped portions of said first and second coil forms being spaced from the periphery of said shaft, said probe being insertable into a tube, said second C-shaped portions of said first and second coil forms being flexible and having a circumference which is sufficiently large to press said first and second test coils against the inside of the tube.

2. A probe as set forth in claim 1, wherein said first and second coil forms are made of plastic.

3. A probe as set forth in claim 2, wherein said second C-shaped portions of said first and second coil forms each have a groove therein in which a corresponding one of said first and second test coils is mounted.

4. A probe as set forth in claim 3, wherein the first end of said shaft is preset with a C shape.

5. A probe as set forth in claim 4, wherein said shaft comprises nylon tubing.

6. A probe as set forth in claim 1, wherein the first end of said shaft is preset with a C shape.

7. A gap measurement probe for measuring a gap between a tube and an antivibration bar in a steam generator, comprising:
   a shaft having a first end for insertion into a tube;
   a first C-shaped coil form fastened to said shaft and surrounding at least a portion of the periphery of said shaft;
   a first test coil mounted on said first C-shaped coil form and extending about a first portion of the circumference of said shaft;
   a second C-shaped coil form fastened to said shaft and surrounding at least a portion of the periphery of said shaft; and
   a second test coil mounted on said second C-shaped coil form and extending about a second portion of the circumference of said shaft which is different from the first portion of the circumference of said shaft, one of said first and second test coils being capable of detecting the gap between the tube and an adjacent one of the antivibration bars when said gap measurement probe is inserted in the tube, said first and second C-shaped coil forms being flexible and having a circumference which is sufficiently large to press said first and second test coils, respectively, against the inside of the tube.

8. A gap measurement probe as set forth in claim 7, wherein said first and second C-shaped coil forms are made of plastic.

9. A gap measurement probe as set forth in claim 8, wherein the first end of said shaft is preset with a C shape, so that when the tube into which the gap measurement probe is inserted is a U-shaped tube, the preset C shape of said shaft orients said first and second test coils so that they are adjacent antivibration bars on opposite sides of the tube.

10. A gap measurement probe as set forth in claim 9, wherein said shaft comprises nylon tubing.

11. A gap measurement probe as set forth in claim 10, wherein said first and second C-shaped coil forms each have a groove therein in which a corresponding one of said first and second test coils is mounted.

12. A gap measurement probe as set forth in claim 7, wherein the first end of said shaft is preset with a C shape, so that when the tube into which the gap measurement probe is inserted is a U-shaped tube, the preset C shape of said shaft orients said first and second test coils so that they are adjacent antivibration bars on opposite sides of the tube.

13. A gap measurement probe for measuring a gap between a tube and an antivibration bar in a steam generator, comprising:
   a shaft having a first end for insertion into a tube;
   a first coil form having a first portion fastened to said shaft and having a second C-shaped portion extending from the first portion and surrounding at least a portion of the periphery of said shaft;
   a first test coil mounted on said second C-shaped portion of said first coil form and extending about a first portion of the circumference of said shaft;
   a second coil form having a first portion fastened to said shaft and having a second C-shaped portion extending from said first portion and surrounding at least a portion of the periphery of said shaft; and
   a second test coil mounted on said second C-shaped portion of said second coil form and extending about a second portion of the circumference of said shaft which is different from the first portion of the circumference of said shaft, one of said first and second test coils being capable of detecting the gap between the tube and an adjacent one of the antivibration bars when said gap measurement probe is inserted in the tube, said second C-shaped portions of said first and second coil forms being flexible and having a circumference which is sufficiently large to press said first and second test coils against the inside of the tube.

* * * * *

UNITED STATES PATENT AND TRADEMARK OFFICE
CERTIFICATE OF CORRECTION

PATENT NO. : 4,704,577

DATED : Nov. 3, 1987

INVENTOR(S) : Junker, Warren R. et al

It is certified that error appears in the above—identified patent and that said Letters Patent is hereby corrected as shown below:

TITLE PAGE, CORRECT INVENTORS NAME TO:

Warren R. Junker, Monroeville; Lee W. Burtner, Elizabeth Township; and Francis X. Gradich, Elizabeth Township, Allegheny County, all of Pa.

Signed and Sealed this

Fourteenth Day of June, 1988

Attest:

DONALD J. QUIGG

Attesting Officer

Commissioner of Patents and Trademarks